United States Patent
Jonsson et al.

(10) Patent No.: US 6,810,722 B2
(45) Date of Patent: Nov. 2, 2004

(54) METHOD AND DEVICE FOR DETERMINING AND ADJUSTING THE UPPER DEAD-CENTER POSITION IN PISTON ENGINES

(76) Inventors: Berth Jonsson, Stratenbo 470, Falun (SE), SE-791 94; Jonas Jonsson, Klockartorpsq 30 B, Vasteras (SE), SE-723 44

( * ) Notice: Subject to any disclaimer, the term of this patent is extended or adjusted under 35 U.S.C. 154(b) by 0 days.

(21) Appl. No.: 10/149,698

(22) PCT Filed: Dec. 14, 2000

(86) PCT No.: PCT/SE00/02528

§ 371 (c)(1),
(2), (4) Date: Oct. 16, 2002

(87) PCT Pub. No.: WO01/44750

PCT Pub. Date: Jun. 21, 2001

(65) Prior Publication Data

US 2003/0177821 A1 Sep. 25, 2003

(30) Foreign Application Priority Data

Dec. 14, 1999 (SE) .......................................... 99045544

(51) Int. Cl.[7] ........................................... G01M 15/00
(52) U.S. Cl. ...................................................... 73/116
(58) Field of Search ............................. 73/118.1, 116, 73/117.3, 120; 417/212; 123/66; 364/563; 702/38

(56) References Cited

U.S. PATENT DOCUMENTS

| | | | |
|---|---|---|---|
| 1,838,256 A | | 12/1931 | Harris |
| 4,147,054 A | | 4/1979 | Hohenberg et al. |
| 4,174,683 A | | 11/1979 | Vivian |
| 4,385,297 A | * | 5/1983 | Schmitt et al. ......... 340/870.31 |
| 4,535,624 A | * | 8/1985 | Ginns et al. ............... 73/119 R |
| 4,589,278 A | * | 5/1986 | Ginns ......................... 73/117.3 |
| 5,027,645 A | | 7/1991 | Leitmeier et al. |
| 5,036,236 A | * | 7/1991 | Wilson ....................... 310/90.5 |
| 5,258,930 A | * | 11/1993 | Fukuyoshi et al. .......... 364/563 |
| 5,342,176 A | * | 8/1994 | Redlich ...................... 417/212 |
| 5,428,992 A | | 7/1995 | Wolfe et al. |
| 5,496,153 A | * | 3/1996 | Redlich ...................... 417/212 |
| 6,155,109 A | * | 12/2000 | Supak .......................... 73/120 |
| 6,536,266 B1 | * | 3/2003 | Akimoto ....................... 73/116 |

FOREIGN PATENT DOCUMENTS

| | | |
|---|---|---|
| DE | 41 20 822 | 1/1993 |
| DE | 42 11 589 | 10/1993 |
| EP | 0 438 360 | 7/1991 |
| FR | 2 746 848 | 3/1997 |

* cited by examiner

*Primary Examiner*—Edward Lefkowitz
*Assistant Examiner*—Octavia Davis
(74) *Attorney, Agent, or Firm*—Young & Thompson

(57) ABSTRACT

A device for determining and adjusting the upper dead-center position in piston engines, in which the position of the piston is measured by an electrically operated sensor (1). The sensor (1) is an eddy-current sensor.

23 Claims, 2 Drawing Sheets

METHOD AND DEVICE FOR DETERMINING AND ADJUSTING THE UPPER DEAD-CENTER POSITION IN PISTON ENGINES

TECHNICAL FIELD

The present invention relates to a method of determining and adjusting the upper dead-centre position in piston engines, in which the position of the piston is measured by distance measurement.

It also relates to a device for determining and adjusting the upper dead-centre position in piston engines, in which the position of the piston is measured by means of an electrically operated sensor.

BACKGROUND OF THE INVENTION

The tip clearance is one of the most import factors in engine design. The less tip clearance, the less fuel consumption and less emissions of so called drive house gases. Therefor, it would be of advantage to be able to determine and control the distance between the piston tip or head and the cylinder head during engine operation, and at different rpm and different loads and temperatures.

Based on measurements of the tip clearance under relevant operation conditions, calculation models describing the tip clearance that are more accurate than contemporary theoretic model studies, such as FEM, would be possible to achieve.

PRIOR ART

U.S. Pat. No. 4,147,054 discloses a method and an apparatus for determining the upper dead-centre position in piston engines. The determination of the dead-centre position is based on a distance measurement, in which the distance between a sensor and the piston is measured. The sensor is either a capacitive distance-measuring transmitter of conventional construction or an inductive distance-measuring transmitter of conventional construction.

The capacitive distance-measuring transmitter is very sensitive to changes in the dielectric in the gap between sensor and the measuring surface, i.e. the piston head. Because the dielectric constant in the combustion gases is difficult to determine and also will change during the combustion, it will be difficult to obtain acceptable values on the tip clearance by means of such a capacitive distance-measuring transmitter.

The inductive distance-measuring transmitter has the disadvantage of only being applicable for the measurement on ferromagnetic materials such as iron. Accordingly, it will not serve for the measurement of aluminium pistons. It is also sensitive to temperatures and pressures and need to be protected from the combustion chamber environment. For the measurement regions that are most likely, typically up to 2 mm, the inductive sensor requires slightly more space than would be desired.

THE OBJECT OF THE INVENTION

It is one object of the invention to provide a method and a device that remedies the disadvantages of the methods and devices of prior art. The inventive method should promote engine design and engine adjustments based on a measurement of the upper dead centre position.

The device should be reliable in operation, relatively cheap to manufacture and easy to handle and insert in the engine the tip clearance of which is to be determined and controlled.

SUMMARY OF THE INVENTION

The object of the invention is achieved by means of the initially mentioned method, characterised in that the position of the piston head is determined by means of an eddy-current sensor.

Thereby, the piston head comprises an electrically conducting material, and that eddy currents are induced therein, preferably by means of generating a current in a coil in the eddy-current sensor. The impact of these eddy-currents on the reactance in a coil of the eddy-current sensor is determined.

Preferably the determination of the upper dead-centre position is performed under dynamic operating conditions of the engine.

The object of the invention is also achieved by means of the initially defined device, characterised in that the sensor is an eddy-current sensor.

The device preferably comprises a coil and means for inducing a current through said coil, said coil being positioned such that an eddy-current will be induced in the piston head as a result of it being subjected to a magnetic field from said coil.

The device also comprises a coil in which the reactance is affected by the eddy currents induced in the piston head, and the determination of the dead-centre position is based on how said reactance is affected by the eddy-current.

Preferably, the coil for inducing the eddy-current in the piston head and the coil the reactance of which is affected by the eddy-current are one and the same measurement coil, forming a part of the eddy-current sensor.

According to one embodiment the inventive device comprises at least one temperature indicator for indicating the temperature that the eddy-current sensor is subjected to. The at least one temperature indicator preferably comprises a reference coil connected to the measurement coil in a Wheatstone bridge.

Preferably, the eddy-current sensor is located in a bore arranged in the cylinder head of the engine.

The bore extends through the cylinder head such that the eddy-current sensor is removable from outside the mounted cylinder head via the bore. Thereby, if desired, the sensor can be easily removed and replaced by a plug.

Preferably, the device is connected to a means for affecting the compression in the engine based on the upper dead-centre position determined by means of the eddy-current sensor.

According to one embodiment, the means for affecting the engine compression comprises a means for displacing the cylinder part of the engine in relation to the crankcase part thereof.

Further, the engine comprises at least two cylinders, each provided with a dedicated eddy-current sensor, and the device comprises a means for affecting the engine compression individually for each cylinder.

The invention also comprises a device for adjusting the combustion chamber volume and the compression in the combustion chamber of a piston engine, characterised in that a cylinder part of the engine is displaceable in relation to a crankcase part thereof. Thereby, the cylinder part is displaceable in relation to the crankcase part along a common sliding plane between cylinder part and crankcase part. Preferably, the cylinder part comprises a first flange and the crankcase comprises a corresponding second flange arranged to be in engagement with the first flange, and the device comprises a means for displacing the cylinder part in relation to the crankcase part through a sliding movement between said flanges. The displacement between cylinder part and crankcase part is preferably based on the determined tip clearance or on an algorithm based on the determined tip clearance.

Further features and advantages of the present invention are presented in the following detailed description of preferred embodiments of the invention and in the appended claims.

BRIEF DESCRIPTION OF THE DRAWINGS

Preferred embodiments of the invention will now be described by way of example with reference to the accompanying drawings, on which.

DETAILED DESCRIPTION OF THE INVENTION

Figure 1:
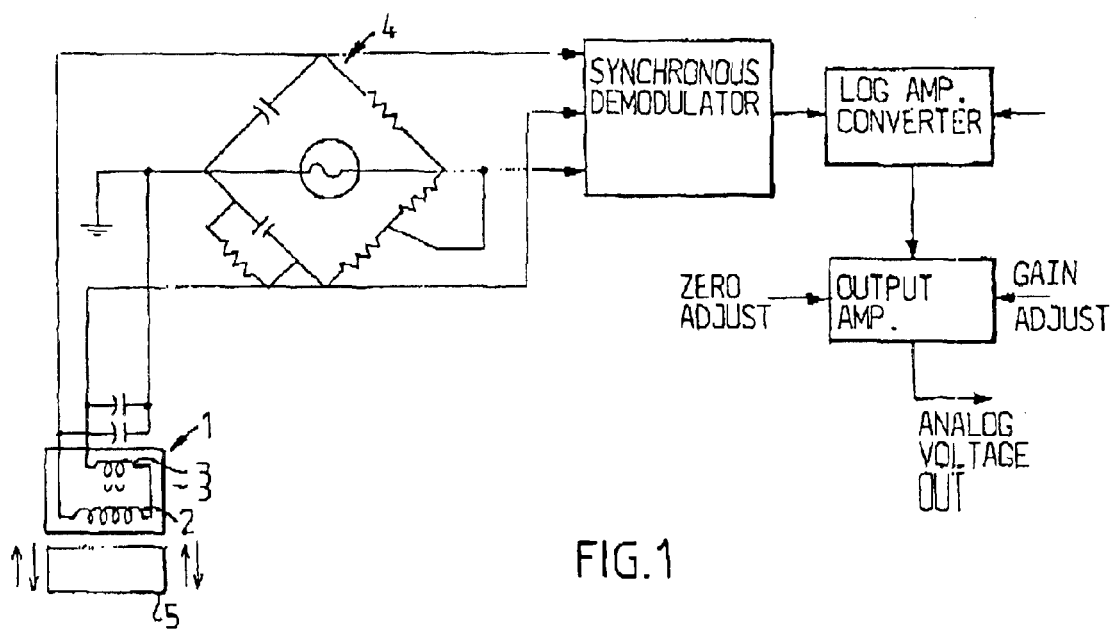
FIG. 1 is a schematic diagram of an eddy-current sensor according to one embodiment of the invention.

FIG. 1 shows an embodiment of an eddy-current sensor 1 according to the invention. The sensor 1 comprises two coils 2, 3 that are connected as in a Wheatstone bridge. These coils 2, 3 are fed with a high frequency alternating current of 50 kHz to 10 MHz, preferably 125 kHz, from an oscillator circuit 4.

The lower coil 2 is located close to the inner surface of the engine cylinder (not shown) and defines a measurement coil. The upper coil 3, located more remote from said inner surface, defines a reference coil for the purpose of indicating temperature differences and variations in the sensor. Since the measurement by the measurement coil 2 changes with changing temperatures, the inventive device might comprise a plurality of temperature sensors. As an alternative or supplement the device might be provided with means for water cooling the sensor 1 order to obtain a more constant temperature.

The sensor 1 generates a magnetic field. A piston head 5 made of electrically conducting material is subjected to the magnetic field as it reaches its upper dead-centre position. Eddy currents are thereby induced in the piston head 5. The electromagnetic field is to a major part or almost exclusively generated by the measurement coil 2.

If the piston head 5 comprises a ferro-magnetic material, the inductive reactance in the coil 2 will increase due to the high permeability in the piston head 5. If the piston head 5 comprises a non-magnetic material, the electromagnetic field of the coil 2 will induce eddy currents in the surface of the piston head 5. The electro-magnetic field that is generated in the piston head 5 will counteract the magnetic field of the coil 2 and thereby induce a change of the reactance in the coil 2. The amplitude change of the reactance depends on the distance between coil 2 and piston head 5.

The resistance and permeability of the piston head material will determine the performance of the device. Non-magnetic materials such as aluminium, copper, gold etc. have a low resistance and permeability around 1. This results in a relatively high sensibility and a large possible measurement distance. The high resistance and/or permeability of materials such as iron or nickel-steel counteracts an effective generation of eddy-currents. The optimal piston head material is therefore aluminium.

In order to obtain the best possible results, a calibration of the sensor 1 against the same material as the piston head material should be performed before using the sensor 1 in its operative position in the engine cylinder.

The sensor 1 must withstand the harsh conditions encountered in the combustion chamber 11, especially the heat and pressure alterations that occur in an engine under operation. Therefor the sensor 1 is pre-strained with a force that is larger than the gas forces in the operation cycle of the engine.

Figure 2:
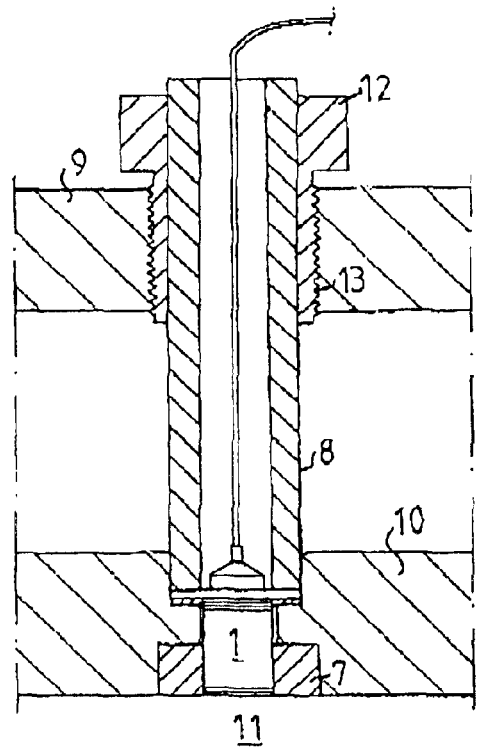
FIG. 2 is a schematic cross-section view of a first embodiment of the inventive device for determination of a piston upper-dead position.

As seen in FIG. 2, the corners or edges of the sensor most adjacent the combustion chamber 11 are protected by means of a protective shield 7 of an electrically non-conducting material, here a ceramic ring made of Boron nitride.

With reference now to FIG. 2, the sensor body 1 is connected to a sleeve 8. The sensor body 1 and sleeve 8 form an elongated element that is inserted in a bore that extends through outer wall 9 of the cylinder head of the engine and through an inner wall 10 of the same cylinder head. Between said walls there is a channel for cooling water. Accordingly, also the sensor will be subjected to cooling provided by the engine's cooling system. A threaded stop element 12 is connected to the sleeve 8 and in engagement with a thread 13 provided at the inner periphery of the bore in the outer wall 9. The stop element 12 transmits the vertical force on the device to the outer wall 9.

Figure 3:
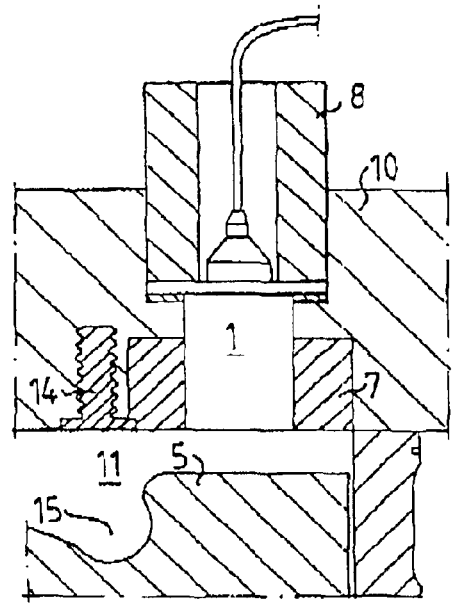
FIG. 3 is a schematic cross-section view of the inventive device for determination of a piston upper-dead position, and the piston.

According to one embodiment, shown in FIG. 3, there is provided a means 14 for preventing the ceramic ring 7 from falling into the combustion chamber 11. The means 14 is a screw driven into the inner wall 10 from the inner surface thereof. In FIG. 3 there is also shown a pit 15 in the piston head 5. It should be noted that differences in the surface structure of the piston head 5 does not affect the accuracy of the measurement as the eddy-current sensor 1 senses the mean value of the total surface covered by the magnetic field.

After calibration and measure value adjustment, even based on type of fuel, the eddy-current sensor 1, then tailored to the engine, may be used for determining how the engine and each relevant construction part is physically affected and affects the tip clearance at different rpm, temperature and loads. Moreover, the piston tilting and the total effect of different plays, such as gliding, rolling etc., and oil films can be determined based on the measurement by means of the sensor 1.

Figure 4:
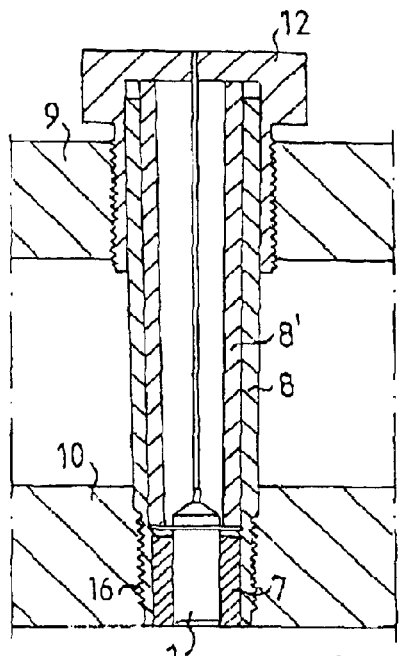
FIG. 4 is a schematic cross-section view of an alternative embodiment of the inventive device.

With reference to FIG. 4 there is shown an alternative embodiment in which the sleeve 8 surrounds the sensor body 1 and is provided with a thread 16 and in engagement with a corresponding thread in the bore in the inner wall 10. An inner sleeve 8' is arranged inside the sleeve 8. The inner sleeve 8' extends from the sensor 1 to the stop element 12.

Figure 5:
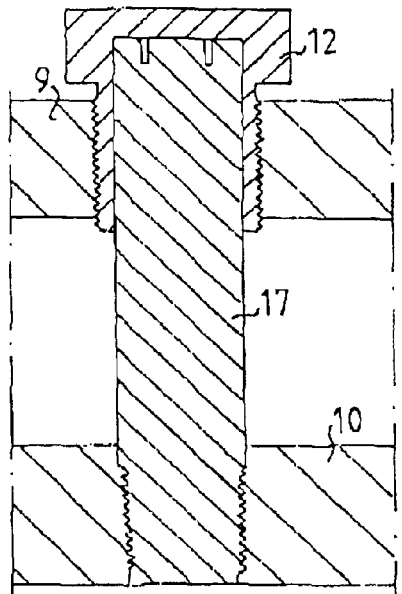
FIG. 5 is a side view of a replacement plug for insertion in a hole in a cylinder part for replacement of and inventive eddy-current sensor.

It is displaceable inside the outer sleeve 8 and it is pre-strained against the sensor by means of the stop element 12. Thereby, the sensor can be pre-strained by means of the stop element 12. The outer and inner sleeves 8, 8' are preferably provided engagement means such as a groove, projection or the like (not shown) for permitting them to be screwed out of the bores in the cylinder from outside said cylinder by means of any torque applying means, such as a screwdriver. After installation and operation, for example in order to check the tip clearance at a regular engine service occasion, the sensor 1 and the sleeve 8 connected thereto can be replaced by a threaded plug 17, shown in FIG. 5. The measurement could also be used in order to calibrate the engine's specific calculation system for calculating the tip clearance before delivery of the engine. The sensor 1 is arranged such that it can be removed from outside the cylinder head. The plug 17 can, in a similar way, be inserted into the bore from outside the cylinder head. Any kind of thread seal is preferably provided between the threads that are in engagement with each other.

Figure 6:
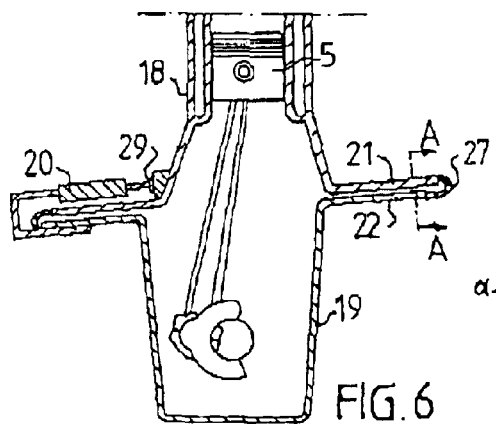
FIG. 6 is a schematic cross section view of a device for adjusting the compression in a piston engine.

With reference to FIG. 6 there is shown a device for adjusting or controlling the compression in the combustion chamber 11 during the operation of the engine. The device displaces the cylinder part 18 of the motor block in relation to the crankcase part 19. Thereby, the distance between the tip of the piston head 5 and the inner surface of the cylinder head will be variable or can be maintained generally constant at different rpm, loads and engine temperatures.

The cylinder part 18 comprises a first flange 21 and the crankcase part 19 comprises a corresponding second flange 22 arranged to be in engagement with the first flange 21, and the device comprises a means 20 for displacing the cylinder part 18 in relation to the crankcase part 19 through a sliding movement between said flanges 21, 22.

In the device in FIG. 6 reference number 20 indicates a hydraulic piston/cylinder arrangement for displacing the cylinder part 18 sideways in relation to the crankcase part 19. A removable distance element, preferably a washer 29 might be provided between the piston/cylinder arrangement 20 and the cylinder part 18 in order to individually pre-set the displacement of the cylinder part 18, for example before the cylinder possibly would be firmly connected to other cylinders. As an alternative to the piston/cylinder arrangement there could be provided a screw arrangement with the same principal task and function.

Figure 7:
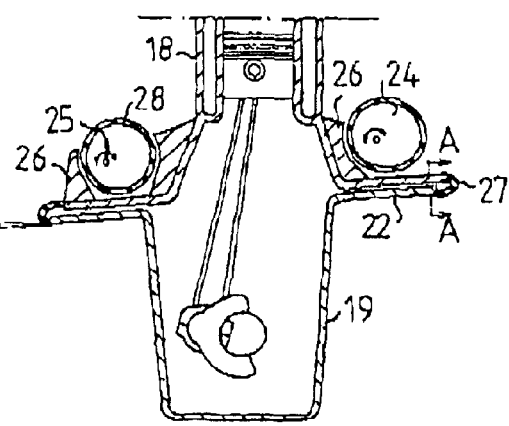
FIG. 7 is a schematic cross-section view of an alternative embodiment of a device for adjusting the compression in a piston engine.

In FIG. 7 there is shown an alternative embodiment of the device in FIG. 6, which comprises rotary rods 24 or the like that are eccentrically arranged and generally cylindrical. The rods 24 rotate around an axis 25, which is displaced in relation to the centre axis of the respective rod 24. The rod or rods 24 are supported by the motor block (not shown in FIG. 7). Reference number 26 indicates a heel or ribbon on the first flange 21. A heel is preferred when the cylinders of the cylinder part are individually arranged and a ribbon is preferred when the cylinders are mounted in one piece. The rods or cylinders 24 are in engagement with respective heels or ribbons 26, and induces the displacement of the cylinder part 18 in relation to the crankcase part 19 upon rolling thereof.

Possibly, the device has to be provided with a means 27, such as a rubber cloth, for obtaining a closed system that encloses the sliding surfaces and possible lubricating oil used therein.

In FIG. 7 there is also shown ring or a bearing 28 arranged on the rods 24. The ring 28 is of such material that it decreases the friction between rods 24 and heel/ribbon 26.

Engines having separate cylinders may have a separate ring or bearing 28 for each cylinder in order to adjust each cylinder individually, for example with reference to a nominal cylinder.

Figure 8:
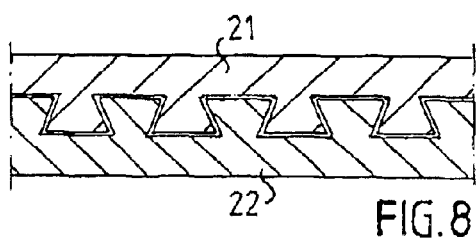
FIG. 8 is a cross-section view along A-A in FIG. 7.

The design of a possible cross section of the engagement between the parts 21,22 is shown in FIG. 8, resulting in sideways stability between the parts 21, 22.

With regard to what has been stated above by way of example, it should be realised that a plurality of alternative embodiments will be obvious for a man skilled in the art without thereby departing from the scope of the invention as described by the appended claims supported by the description and the accompanying drawings.

It should be understood that the inventive device can include only one eddy-current sensor 1 for the purpose of determining the tip-clearance of an individual piston, the determined tip-clearance being used as a base for the adjustment of the tip-clearance and/or compression for that single cylinder or for a plurality of cylinders of a plural cylinder engine. The determination of the tip-clearance, i.e. the upper dead-centre point, can be done at a regular basis in order to directly act as a basis for an immediate engine compression control. However, it may also be performed at generally irregular basis, for example in order to up-date an algorithm based on which the engine compression is controlled.

The eddy-current sensor 1 should always be adapted to the prevailing operation conditions, such as fuel used, temperature, and other engine characteristics. Therefor re-calibration of the sensor might be needed at a more or less regular basis.

As seen in FIG. 7, there is preferably a tilting angle $\alpha$ between the gliding plane of the parts 21,22 in relation to the horizontal plane, preferably $-15°$ to $15°$.

What is claimed is:

1. A method of determining and adjusting the tip-clearance of the upper dead-centre position in piston engines, in which the position of the piston (5) is measured by distance measurement, comprising the step of:

determining and adjusting the position of a movable piston head using an eddy-current sensor (1) located in a bore arranged in the cylinder head (9,10) of the engine to determine and adjust the tip-clearance at the upper dead centre of the piston, the piston moving interior to a cylinder of a piston engine.

2. A method according to claim 1, characterised in that the piston head (5) comprises an electrically conducting material, and that eddy currents are induced therein by means of generating a current in a coil (2) in the eddy-current sensor, and that the impact of these eddy-currents on the reactance in a coil (2) of the eddy-current sensor is determined.

3. A method according to claim 1, characterised in that the determination of the dead-centre position is performed under dynamic operating conditions of the engine.

4. A method according to claim 1, characterised in that, in an engine provided with means (20,24,26,28) for varying or controlling the compression thereof during operation, the compression is varied or controlled based on the determined dead-centre position.

5. A device for determining and adjusting the tip-clearance of the upper dead-centre position in piston engines, in which the position of the piston (5) is measured by means of an electrically operated sensor (1), characterised in that the sensor (1) is an eddy-current sensor located in a bore arranged in the cylinder head (9, 10) of a piston engine and configured to measure the tip-clearance at the upper dead centre of the piston, the piston movable interior to a cylinder of the piston engine.

6. A device according to claim 5, characterised in that it comprises a coil (2) and means (4) for inducing a current through said coil, said coil (2) being positioned such that an eddy-current will be induced in the piston head (5) as a result of it being subjected to a magnetic field from said coil (2).

7. A device according to claim 6, characterised in that it comprises a coil (2) in which the reactance is affected by the eddy currents induced in the piston (5) head and that the determination of the dead-centre position is based on how said reactance is affected by the eddy-current.

8. A device according to claim 7, characterised in that the coil for inducing the eddy-current in the piston head and the coil the reactance of which is affected by the eddy-current are one and the same measurement coil (2), forming a part of the eddy-current sensor (1).

9. A device according to claim 5, characterized in that it comprises at least one temperature indicator (3) for indicating the temperature that the eddy-current sensor (1) is subjected to.

10. A device according to claim 9, characterised in that said at least one temperature indicator (3) comprises a reference coil (3) connected to the measurement coil in a Wheatstone bridge.

11. A device according to claim 5, wherein, the eddy-current sensor (1) comprises two coils (2,3) connected as a Wheatstone bridge, and fed with an alternating current, a first coil (2) of the two coils, located adjacent an inner surface of the engine cylinder, serving as a measurement coil, a second coil (3) of the two coils, located remote from the inner surface, serving as a reference coil indicating temperature differences and variations in the sensor, an amplitude change of the reactance of the first coil depending on the distance between first coil (2) and the head of the piston (5), the sensor calibrated for determining the tip clearance at different rpm, temperature and loads of the engine.

12. A device according to claim 5, characterised in that the eddy-current sensor (1), located in said bore, is at least partly enclosed by an electrically non-conducting material.

13. A device according to claim 12, characterised in that said non-conducting material defines a ring (7) that surrounds the eddy-current sensor (1).

14. A device according to claim 5, characterised in that the bore extends through the cylinder head (9,10) such that the eddy-current sensor (1) is removable from outside the mounted cylinder head (9,10) via the bore.

15. A device according to claim 5, characterised in that it is connected to a means (20,24,26,28) for affecting the compression in the engine based on the upper dead-centre position determined by means of the eddy-current sensor (1).

16. A device according to claim 15, characterised in that the means (20,24,26,28) for affecting the engine compression comprises a means (20,25) for displacing the cylinder part (18) of the engine in relation to the crankcase part (19) thereof.

17. A device according to claim 15, characterised in that the engine comprises at least two cylinders, each provided with a dedicated eddy-current sensor (1), and that the device comprises a means (20, 24, 26, 28) for affecting the engine compression individually for each cylinder.

18. A device for adjusting the combustion chamber volume and the compression in the combustion chamber of a piston engine, comprising:

a piston engine with a combustion chamber having a combustion chamber volume and, during operation, a compression in the combustion chamber, the piston engine further comprising an arrangement (20; 24) for displacing a cylinder part (18) of the engine in relation to a crankcase part (19) thereof, the cylinder part (18) thereby being displaced through a sliding movement sideways in relation to the crank case part (19), at least two cylinders; and means (29; 28) for displacing the cylinder parts (18) individually for each cylinder, the means for displacing the cylinder parts individually comprising a removable distance element provided between the cylinder part (18) and said arrangement (20; 24) for individually pre-setting the displacement of the cylinder parts (18), wherein the means for displacing the cylinder parts individually are operable for adjusting the combustion chamber volume and the compression in the combustion chamber of the piston engine by sliding the cylinder part sideways in relation to the crank case part.

19. A device according to claim 18, characterised in that said arrangement (20) comprises a piston/cylinder arrangement, and that the means (29) for individually displacing a cylinder part (18) comprises a washer (29).

20. A device according to claim 18, characterised in that said arrangement (24) comprises rods that are eccentrically arranged, and that the rods (24) have a separate ring or bearing arranged thereon for each cylinder in order to adjust the displacement of each cylinder individually.

21. A device according to claim 18, characterised in that there is a tilting angle between the sliding plane of the cylinder part and crankcase part and the horizontal plane, preferably −15° to 15°.

22. A device according to claim 18, characterized in that the cylinder part (18) is displaceable in relation to the crankcase part (19) through a movement along a common sliding plane between cylinder part (18) and crankcase part (19).

23. A device according to claim 18, characterised in that the engine comprises at least two cylinders, each provided with a dedicated eddy-current sensor (1).

* * * * *